3,454,829
SPARK-ERODING APPARATUS
Hans Schierholt, Iserlohn, Germany, assignor to Deutsche Edelstahlwerke Aktiengesellschaft, Krefeld, and Allgemeine Elektricitats-Gesellschaft, Berlin-Grunewald, Germany
Continuation-in-part of application Ser. No. 426,589, Jan. 19, 1965. This application May 24, 1967, Ser. No. 640,892
Claims priority, application Germany, Jan. 20, 1964, D 43,393
The portion of the term of the patent subsequent to July 5, 1983, has been disclaimed
Int. Cl. H05b 37/02, 39/08
U.S. Cl. 315—175      2 Claims

ABSTRACT OF THE DISCLOSURE

Apparatus for controlling sparking and spark erosion machines. A source of direct current is connected across the working gap to provide a test current therethrough, and an electronic trigger circuit is connected across the gap for generating a trigger pulse whenever the voltage across the gap exceeds a predetermined level indicating a proper condition within the gap. A pulse generator, responsive to said trigger pulse, is connected across the working gap to initiate a discharge as soon as the proper conditions exist within the gap.

---

This application is a continuation-in-part of application Ser. No. 426,589, filed Jan. 19, 1965, now abandoned.

The present invention relates to a method of controlling sparking in spark-erosion machines.

Spark-erosion machines have been proposed (see the specification of application Ser. No. 215,133 dated Aug. 6, 1962, now Patent 3,259,795) in which a tool electrode and the work are connected to a source of direct current voltage in a circuit containing a resistance sufficiently high to prevent said source from sustaining an independent discharge. A measuring device directly senses the voltage between the tool electrode and the work and is arranged to prevent the supply of the necessary power for a discharge to take place until the voltage across the gap exceeds a value, generally 40 volts, which is characteristic of a desired physical state in the gap. This continuous monitoring of the existing conditions in the working gap results in the sequence of sparks no longer being controlled by preselected interval signals or the like. The arrangement therefore overcomes the drawback of power being supplied for triggering a discharge across the gap that is not yet properly deionized or that is excessively fouled. On the other hand, the arrangement avoids the necessity of providing the lengthy intervals between successive discharges that would otherwise be required for safety reasons.

In the aforesaid specification, a circuit of the above-described kind is used for spark erosion machines in which the generator is associated with a storage condenser with controlled charging rate.

As a further development of the invention described and claimed in the said specification, the present invention proposes to use such a circuit in spark-erosion machines which lack storage devices for the spark production, in such a way that a pulse which triggers an erosive spark is initiated when the voltage across the gap exceeds a value characteristic of a desired physical state in the gap.

To carry out the invention there is provided in a spark-eroding apparatus, a pulse generator of well known construction such as a one-shot multivibrator, relaxation oscillator or the like, for effecting discharge across an electrode and the work, of a direct current voltage source in a circuit including the said gap and containing a resistance which is sufficiently high to prevent said source from maintaining an independent discharge across the said gap, and a trigger circuit responsive to the conditions prevailing in the gap to trigger an erosive spark discharge of energy direct from the pulse generator to be triggered as soon as the voltage across the gap exceeds a value that is characteristic of the existence of a desired condition in the gap. When reference is made to "energy direct from" the pulse generator it is meant that there is no storage means in which the spark discharge energy is stored, and therefore no appreciable time delay.

Figure 1:
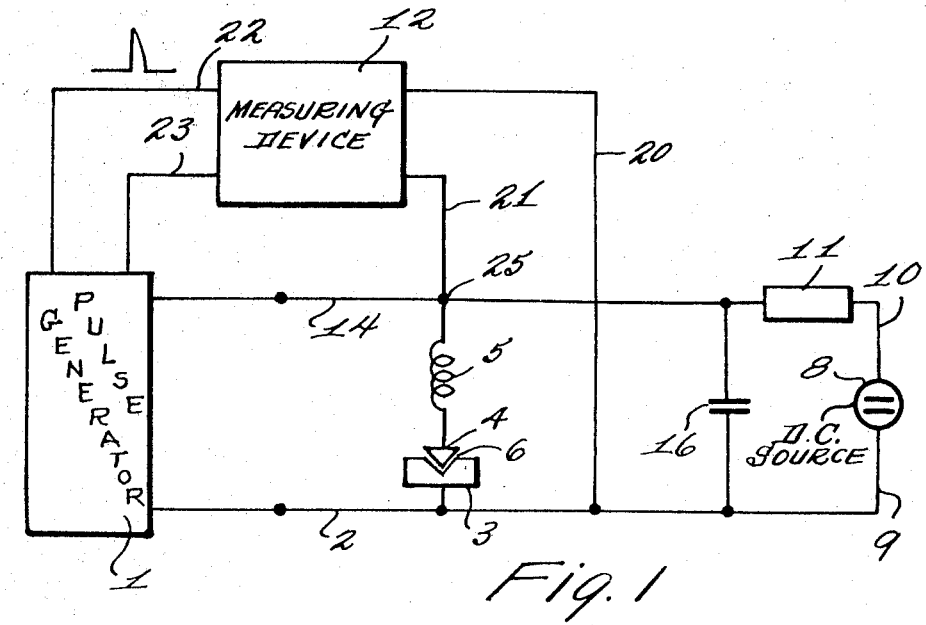

A preferred embodiment of the invention is exemplified in FIGURE 1.

Figure 2:
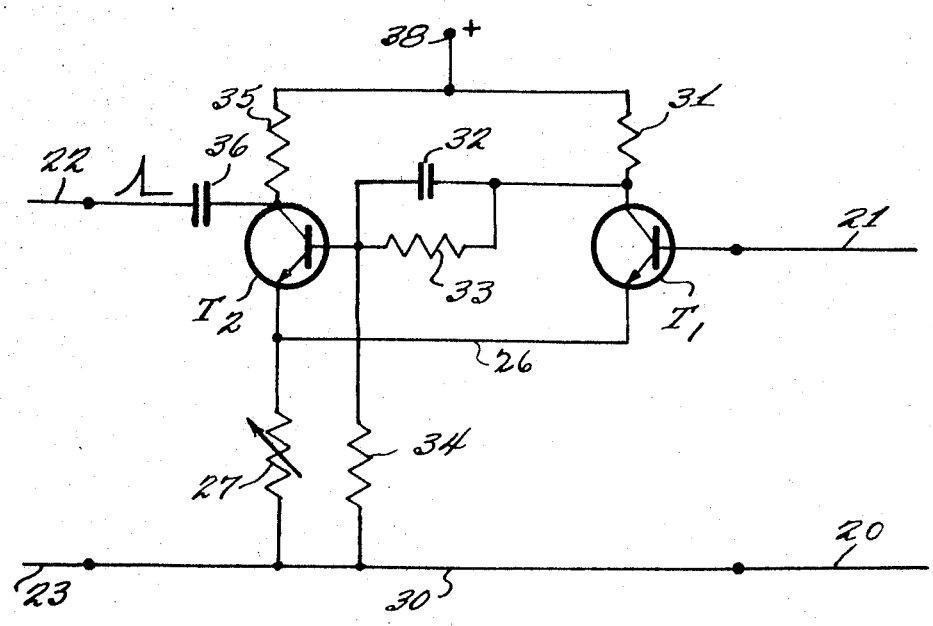

FIGURE 2 is a schematic diagram of a preferred trigger circuit.

A pulse generator 1 which is not associated with storage means, is connected by conductors 2 and 14 comprising an inductance 5 in the discharging circuit, on the one hand, to the spark electrode 4 and, on the other hand, to the work 3. A separate source of direct current voltage 8, which serves as the monitoring source, is connected by a conductor 10 containing a resistor 11 and a conductor 9 to the poles of a monitoring condenser 16 in a branch circuit parallel to the working gap 6. The magnitude of resistor 11 is so determined that the current that can flow through conductors 9 and 10 is by itself incapable of maintaining a sustained discharge across working gap 6. When in this circuit, after a preceding discharge, the working gap 6 has been deionized the gap ceases to constitute a short circuit across condenser 16. Consequently a charge builds up in condenser 16 through the resistor 11. As soon as the voltage across the condenser 16 has reached say 40 volts, this is an indication that the next sparking pulse will find the state of the working gap suitable for the generation of an erosive spark. A trigger circuit 12, which is connected in parallel to condenser 16, is adjusted to respond to this voltage.

In accordance with a preferred embodiment of the present invention, the trigger circuit 12 is in the form of a Schmitt trigger circuit as shown in FIGURE 2 wherein the base of transistor T-1 is connected via lead 21 to terminal 25 (FIGURE 1). Emitter transistor T-1 is connected to emitter of transistor T-2 via lead 26 and through a variable resistor 27 to lead 20 by bus 30. The collector of transistor T-1 is connected through a resistor 31 to a suitable source of direct current voltage (not shown). The collector of transistor T-1 is also connected through the parallel combination of capacitor 32 and resistor 33 to the base of transistor T-2. The base of transistor T-2 is also connected through a resistor 34 to bus 30 and lead 23. The collector of transistor T-2 is connected through a resistor 35 to the source of direct current voltage and is also connected through a capacitor 36 to lead 22. Leads 22 and 23, as can be seen from FIGURE 1, are connected to pulse generator 1.

In operation, the base of transistor T-2 is normally forward biased by the voltage across resistor 34, and therefore, is normally conducting current from the DC source to bus 30 through resistor 27. The voltage across resistor 27 is applied to the emitter of transistor T-1, thereby back biasing the emitter-base junction. This transistor is therefore non-conductive. The variable resistor 27 determines the magnitude of the biasing voltage on transistor T-1 and in accordance with the present invention, is adjusted to be approximately 40 volts.

When the voltage on lead 21, which is the voltage across the working gap 6 of FIGURE 1, increases to a point greater than 40 volts, transistor T-1 begins to conduct thus increasing the voltage on the emitter of transistor T-2 and decreasing the voltage on its base. In this manner, regenerative cut-off of transistor T–2 occurs. This rapid cut-off of transistor T–2 causes the voltage on its collecter to rapidly increase to the value of the direct current voltage applied to terminal 38. This voltage pulse is coupled through capacitor 36 to a pulse generator 1 through lead 22. The shape of this pulse 1 on lead 22 as indicated in FIGURE 2 is effective to trigger pulse generator 1 to effect a discharge across the gap 6 when the conditions in the gap are proper for a machining discharge to occur, without a time delay due to storage condensers.

What is claimed is:

1. In a spark erosion apparatus having a spark erosion gap between a work piece and a working electrode, a pulse generator connected across said gap and adapted to be triggered to supply a pulse directly to said gap to substantially instantaneously effect a discharge thereacross, means to trigger said pulse generator comprising, a source of reference potential, a resistor, said source of reference potential, and said resistor being of such a value as to prevent said source of reference potential from independently maintaining a discharge across said gap and an electronic trigger means connected across said gap for generating a short duration control voltage, which operates said pulse generator, when voltage across said gap, due to said reference potential after deionization, reaches a predetermined value characteristic of the existence of a desired condition in the gap, and means for connecting said voltage pulse to said pulse generator to thereby trigger said pulse generator, said apparatus being free from energy storage means of sufficient magnitude to cause a discharge across said gap.

2. An apparatus as claimed in claim 1 wherein said electronic trigger means comprises, first and second transistors having base emitter and collector electrodes, biasing means connected to said first and second transistor for maintaining said first transistor in a normally noncoductive condition and said second transistor in a normally conductive condition, means connecting the voltage across said gap to the base of said first transistor said biasing means being such that when the voltage applied to base of said first transistor exceeds a predetermined value, said first transistor will become conductive, and means connecting said first transistor to said second transistor for causing regenerative cut-off of said second transistor in response to said first transistor becoming conductive and means connecting the voltage across said second transistor to said pulse generator whereby said pulse generator is triggered in response to the regenerative cut-off of said second transistor.

References Cited

UNITED STATES PATENTS

| | | | |
|---|---|---|---|
| 3,259,795 | 7/1966 | Schierholt | 315—227.1 |
| 3,287,608 | 11/1966 | Pokrant | 307—88.5 |
| 3,292,040 | 12/1966 | Ullman et al. | 315—227.1 |

JOHN W. HUCKERT, *Primary Examiner.*

J. D. CRAIG, *Assistant Examiner.*

U.S. Cl X.R.

219—131; 307—235; 315—176, 241